Feb. 23, 1932.  F. J. ENGLEN  1,847,000
SLICING AND CUTTING MACHINE
Filed March 29, 1930  3 Sheets-Sheet 1

Inventor
Frederick J. Englen
By
Attorney

Feb. 23, 1932.    F. J. ENGLEN    1,847,000
SLICING AND CUTTING MACHINE
Filed March 29, 1930    3 Sheets-Sheet 2
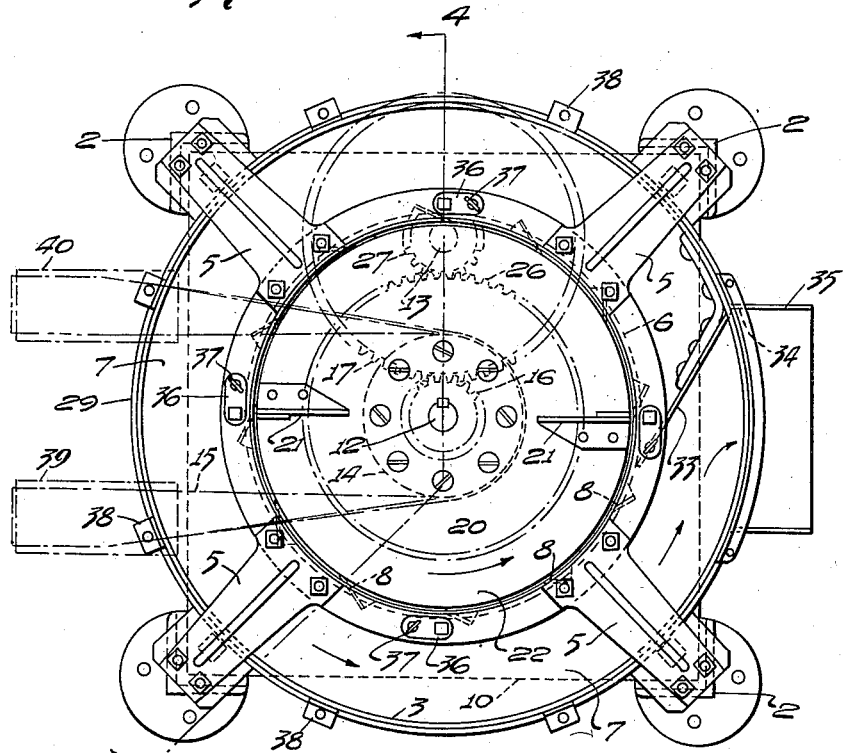
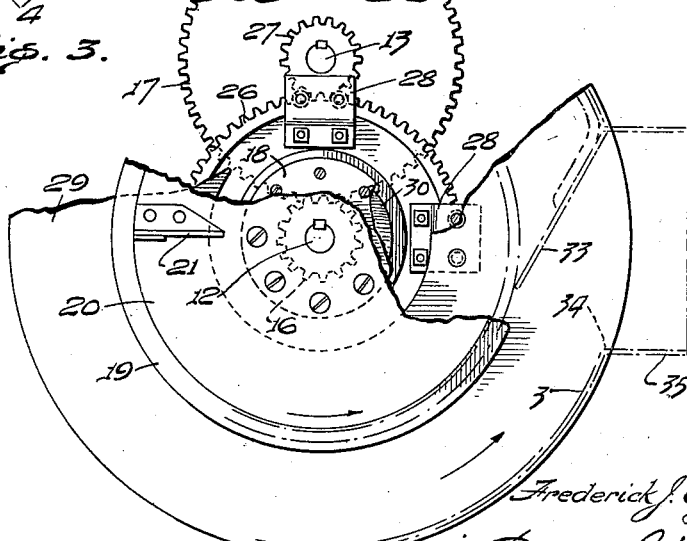
Inventor
Frederick J. Englen

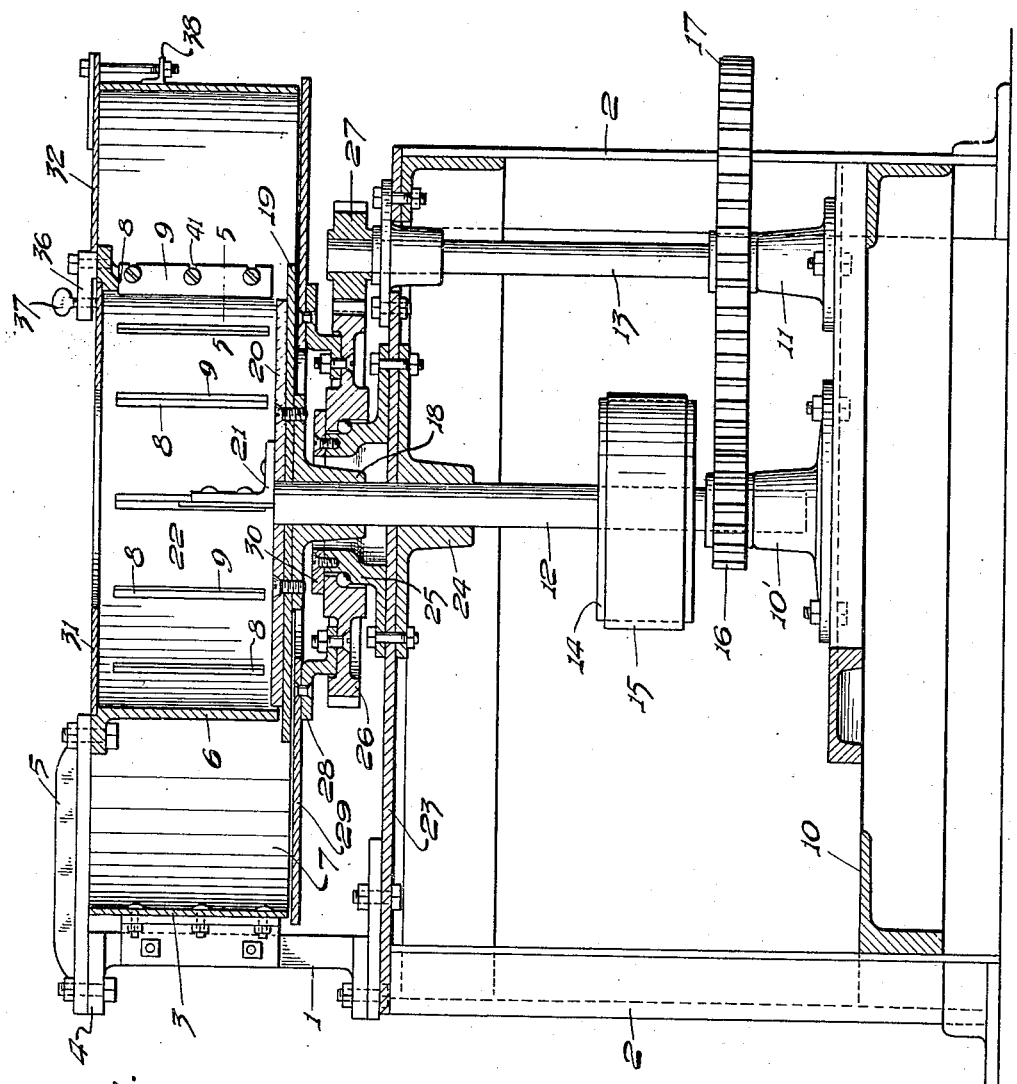

Patented Feb. 23, 1932

1,847,000

UNITED STATES PATENT OFFICE

FREDERICK J. ENGLEN, OF OMAHA, NEBRASKA

SLICING AND CUTTING MACHINE

Application filed March 29, 1930. Serial No. 440,011.

My invention relates to a machine for cutting and slicing animal and vegetable products, such as meat, fat, cabbage, potatoes, etc. so that slices will result adaptable and convenient for subsequent rendering, frying or other operations.

The invention further relates to a machine which acts upon material to be sliced thru the medium of centrifugal force, functioning in such a manner that the centrifugal force coordinating with the inertia of a moving mass of material throws such material against a plurality of knives.

In the prior art, various proposals have been made to slice and cut materials by machinery. Many of these proposals have employed rotating discs together with cooperating knives, but they have been unsatisfactory because of the application of gravitational force to provide the cutting pressure, resulting in irregular, hit and miss slicing, or jamming of the machine. In order to overcome this so-called gravitational slicing pressure, springs have been resorted to, to apply pressure normal to gravity, but this has only aggravated matters as springs take up valuable machine space, become rusty and eventually lose their resiliency.

I have discovered that satisfactory and regular cutting may be obtained by the method and apparatus I employ, thus obviating the disadvantages of the prior art.

My preferred apparatus is shown in the drawings.

Figure 2 is a top plan view with the top cover removed.

Figure 3 is a plan view partly broken away showing the means of attaching the gears to the plates.

Figure 4 is a view in section taken on the line 4—4 of Figure 2.

Figure 1:
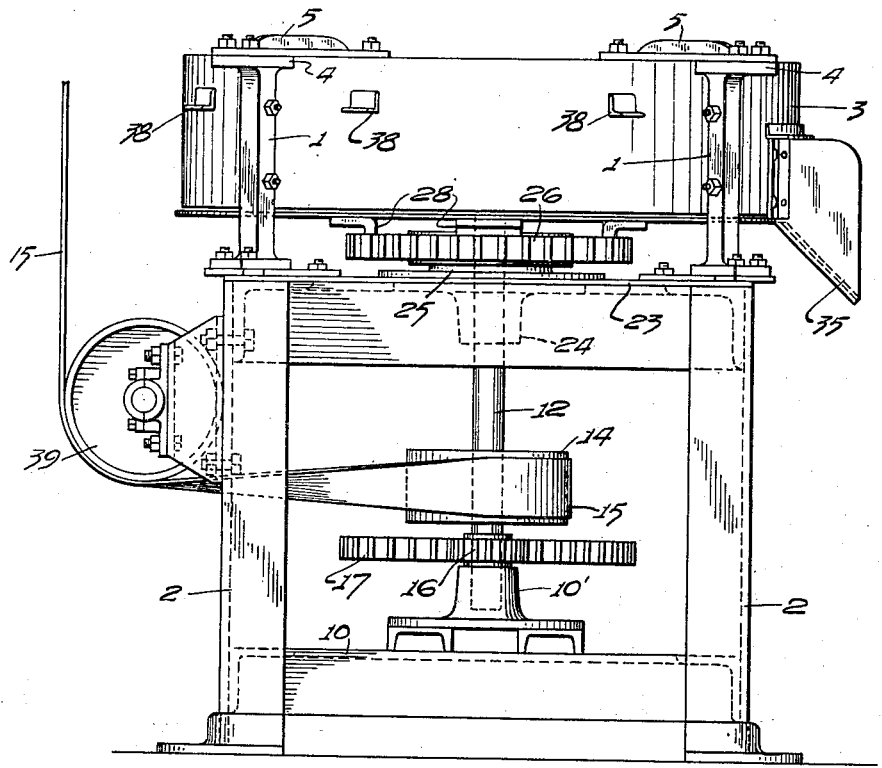
Figure 1 is a view in side elevation.
Figure 6:
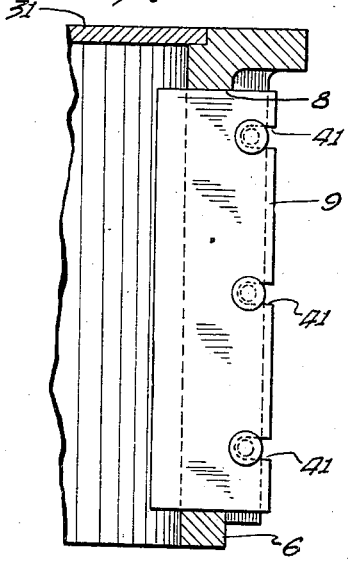
Figure 6 is a view along line 6—6 of Figure 5 showing one of the knives in positioin.
Figure 5:
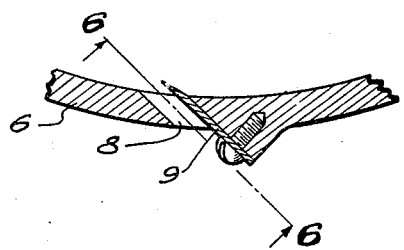
Figure 5 is a horizontal section taken on line 5—5 of Figure 4 showing the knife blade attached to the cylinder wall.

Referring to the drawings, and specifically to Figure 4, the flanged posts 1 are suitably supported upon the upright standards 2. Secured to these posts is the outer cylindrical member 3. A top spider 5 is supported by and secured to the top flanges 4 of the posts, and an inner cylinder 6 depends from said spider and forms with the outer cylinder 3 an annular channel 7. The inner cylinder 6 is provided with a plurality of vertical slot-like substantially tangential apertures 8, in each of which a knife blade 9, specifically shown in Figures 5 and 6 is mounted.

Resting upon the shelf 10 carried by standards 2 are the bearing supports and bearings 10′ and 11 in which shafts 12 and 13 are respectively adapted to rotate; shaft 12 being actuated by the power transmitted by belt 15 and pulley 14, while shaft 13 is rotated by engaging gears 16 and 17.

The shaft 12 carries the fixed collar 18 to which is secured the plate 19 and disc 20 adapted to rotate therewith. The disc 20 has attached thereto a plurality of scoops 21 also adapted to rotate in the interior 22 of cylinder 6.

Suitably supported by the upper portion of standards 2 is a plate 23 which carries on its under side the shaft bearing 24 and on its upper side the ball-bearing support 25. The gear 26 has formed therein the top race for the ball-bearing and rotates thereon, being actuated by the engaging gear 27 fixed to shaft 13. The gear 26 has secured thereto the Z-shaped element 28, which in turn carries the disc 29, adapted to be the rotating bottom of the annulus 7. The member 30 attached by studs to bearing support 25 prevents upward displacement of the gear 26. The top plate 31 is provided with a circular cutout portion while top plate 32 provides a top closure for channel 7.

Referring to Figure 2 it will be seen that the annular passage 7 contains a baffle plate 33 secured to the cylinder 3. Adjacent to this baffle plate, the cylinder 3 has a cut-out discharge opening 34 which communicates with a discharge apron 35.

Referring to further details of the drawings; members 36 carrying wing nuts 37, while cylinder 3 carries elements 38 to secure the top plate 32. The belt 15 is adapted to run over the idlers 39 and 40.

The operation of the device is as follows:

The material to be sliced is fed thru the circular opening of top plate 31 into the chamber 22 and contacts with the rapidly rotating disc 20 which carries the scoops 21. The material subjected thus to centrifugal force is thrown directly against the knife blades 9 with no opposing medium therebetween. This is an important feature of my invention because it permits the total centrifugal force to act upon the material to cut the same upon the knives. The slices are ejected thru the vertical slot apertures onto the rotating disc 29, which carries the slices around till they meet the baffle plate 33, which diverts them thru the discharge opening 34. The discs 20 and 29 are adapted to revolve in the same direction as shown by the arrows.

The mechanism I have described is compact, easily assembled, and the parts are conveniently replaceable, without any sacrifice of ruggedness nor endurance necessary for continuous operation. The knife blades are replaceable and adjustable by virtue of the slots 41 shown in Figure 6. While I have shown the various parts secured together by bolts and nuts, if desired the various parts may be secured in any other well-known manner, as by welding, if expedient. It is also within my invention to change the angular direction of the scoops 21 and to make other minor changes in mechanical features.

I claim:

1. In a machine of the class described, the combination of a rotatable shaft having a horizontal disc secured thereto, a second rotatable shaft, a second horizontal disc of larger diameter than said first disc rotatable below said first named disc and actuated by said second shaft, a cylindrical member disposed above and in vertical relation to the first disc, and having vertical slots in its wall, knives mounted, respectively, in said slots obliquely to the inner surface of said cylindrical member, and a second cylindrical member disposed in vertical relation to the second disc and spaced from the first-named cylindrical member.

2. In a slicing machine, a plurality of vertical slicing knives having their cutting edges arranged in a circle and directed inwardly of and obliquely to such circle, a casing surrounding and spaced from the outer ends of said knives, two rotatable shafts geared together, a flat disc secured directly to the first shaft below the lower ends of said knives, a bearing supported gear engaging a gear on the second shaft concentric with the first shaft, and a second flat disc carried by said bearing supported gear and forming the bottom of said casing.

3. In combination, two stationary concentric cylindrical members, posts and a spider thereon supporting said members, the inner cylindrical member having vertical apertures in its walls, knives mounted in said apertures with their cutting edges directed inwardly of said member, an inner rotatable disc forming a bottom for the inner cylindrical member, scoop members carried by said inner disc, an outer rotatable disc coordinating with the speed and direction of the inner disc and forming a bottom for the space between the concentric members, rotatable means including shafts for actuating said discs, bearing means for said shafts, bearing means for the outer disc, and supporting means for said posts and shaft bearing means.

4. A slicing machine, comprising a stationary cylindrical member having slots in its wall, knives mounted, respectively, in said slots with their cutting edges disposed obliquely to the inner surface of said cylinder, a circular plate forming the bottom of said cylinder, a second cylinder surrounding and spaced from said first-named cylinder to receive sliced material from said knives, said second cylinder having an outlet in its wall, a rotatable annulus bridging the space between the lower ends of said cylinders, and a deflector fixed in said second cylinder obliquely to the wall of the latter to direct said sliced material to said outlet.

5. A slicing machine according to claim 4 including a second annulus closing the space between the upper ends of the inner and outer cylinders.

6. A slicing machine comprising a platform, a casing open at its lower end and supported above said platform, a cylinder open at its lower end within said casing and also supported above said platform, said cylinder having a slot in its wall, a knife mounted in said slot with its cutting edge extending into said cylinder obliquely to the wall af the latter, a rotatable shaft having a bearing in said platform, a bottom member for said cylinder carried by said shaft, a gear rotatable around said shaft above said platform, a bottom member for said casing supported by said gear beneath the bottom member of said cylinder, a second rotatable shaft having a bearing in said platform, and a gear carried by said second shaft and meshing with said first-named gear.

7. A slicing machine according to claim 6 wherein the casing has an outlet in its wall and a deflector is fixedly mounted in said casing adjacent said outlet to direct sliced material to said outlet.

In testimony whereof I have hereunto set my hand.

FREDERICK J. ENGLEN.